April 20, 1965   A. D. MURRAY   3,179,302
FILTER POWDER FEEDER ASSEMBLY
Filed Feb. 15, 1963   2 Sheets-Sheet 1

INVENTOR.
ALLIE D. MURRAY
BY
Lockwood, Woodard, Smith & Weikart
Attorneys

3,179,302
FILTER POWDER FEEDER ASSEMBLY
Allie D. Murray, Indianapolis, Ind., assignor to Altamil Corporation, Indianapolis, Ind., a corporation of California
Filed Feb. 15, 1963, Ser. No. 258,818
3 Claims. (Cl. 222—233)

This invention relates generally to powdered material feeding apparatus and in particular to an assembly for storing a supply of filter powder and for feeding metered amounts of filter powder to a filter structure.

In the filtration of solids from liquids it has been common in the industry to use a tubular type diatomaceous earth filter, in which filtration takes place on the pressure side of the filter tube. Filtration is accomplished by depositing a layer of clean filter powder, usually diatomaceous earth, on the surface of the tube which forms a porous cake. This initial layer of diatomaceous earth is commonly referred to as the pre-coat. After the filter has been pre-coated, solid soils collect on the surface of the layer of diatomaceous earth. It is usual during filtration to periodically add additional small amounts of diatomaceous earth or other filter aid in order to mix with the solids and maintain a porous cake on the filter tube, thus lengthening the period of time which the filter can operate efficiently. Eventually, the thickness of the cake, consisting of filter aid and solid soils, creates a sufficient pressure drop across the filter so that the pump can no longer supply the necessary liquid volume. When this condition is reached, it is necessary to clean the filter and re-coat the tubes with a fresh pre-coat.

Cleaning of the filter is accomplished in many ways, one being to shut off the flow through the filter. The clean layer, known as the pre-coat, will then normally break loose from the tubes and settle to the bottom from whence it can be removed by drainage or by reversing the flow through the filter to a suitable container. The efficient performance of the filter is directly related to the uniformity of the pre-coat and the continual addition of the small amounts of filter aid, known as the body feed.

The primary object of the present invention is to provide a filter aid feeder assembly of relatively simple, trouble-free construction which accurately meters selectively both a proper amount of filter aid for pre-coating of the filter element and, at intervals, the proper amount of filter aid for body feed.

A further object of the present invention is to provide an assembly of the type referred to having means for closing off the filter aid storage component of the assembly while the filter aid material is being transferred to the filter apparatus.

A further object of the present invention is to provide an assembly of the type referred to having means for minimizing the entry of vapors, arising from the liquid in the filter apparatus, into the filter aid storage hopper portion of the assembly.

These and other objects will become apparent as the description proceeds with reference to the accompanying drawings in which.

Figure 1:
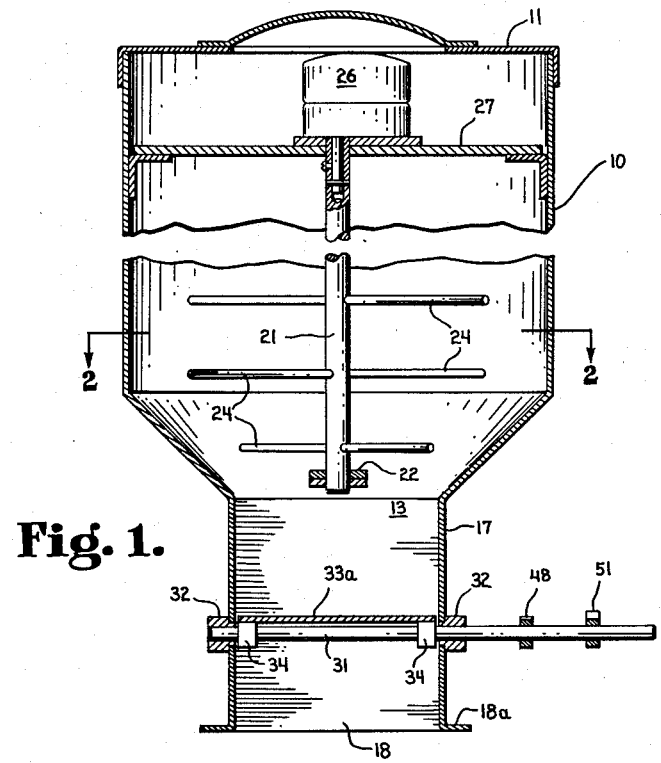
FIG. 1 is a side sectional view of the assembly of the present invention with the actuating solenoids for the metering cup omitted.

Referring to the drawings, the assembly of the present invention includes a storage hopper 10 which is circular in cross-section having its upper end closed by a removable cover 11. The hopper is circular in cross-section and at its base tapers inwardly to define an outlet aperture 13, the configuration of the outlet aperture 13 being apparent in FIG. 2. As will be evident from FIG. 3, the plane of the outlet aperture 13 is somewhat tilted with respect to the vertical since one side of the tapered base of the hopper is foreshortened (identified at 14 in FIG. 3) as compared to the other side of the hopper (indicated at 16 in FIG. 3). Extending from the outlet aperture is a housing portion 17, rectangular in cross-section, which defines a discharge passage identified at 18. The lower end of the housing forming the discharge passage is flanged outwardly to provide the mounting flange 18a which, as may be seen in FIG. 3, may be rigidly secured to the top of a filter tank (shown fragmentarily at 19), the discharge passage 18 registering with an opening in the tank top 19. Since the filter tank itself forms no part of the present invention, it is not disclosed herein, it being noted however that conventionally the tank would contain a supply of liquid being filtered and would have the pump suction opening located in the container adjacent to the aperture over which the assembly of the present invention is mounted so that the filter aid discharged by the assembly of the present invention will be rapidly picked up by the pump and deposited on the filter elements.

Figure 2:
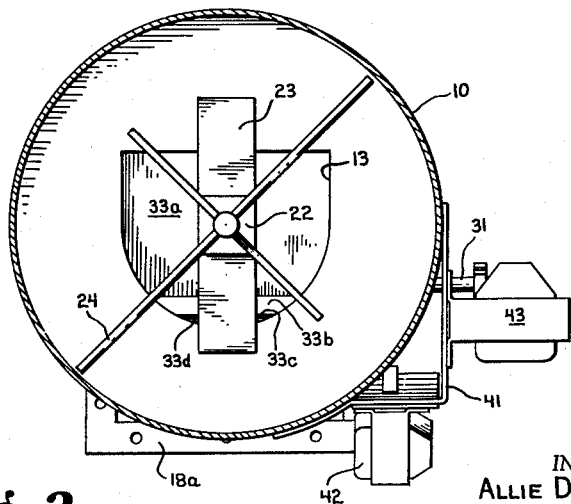
FIG. 2 is a top sectional view taken generally along the line 2—2 of FIG. 1 but showing the solenoid actuators in place on the assembly.

Extending vertically through the hopper is a shaft 21 which is mounted for rotation therein by means of a pilot bearing 22 supported by a transverse bracket 23 (FIG. 2). The shaft 21 carries means for agitating the filter aid in the hopper which takes the form of the agitator arms 24. The upper end of the shaft 21 has pinned thereto a downwardly extending shaft of a drive motor 26, the motor being supported by the transverse bracket 27 supported at the sides of the hopper and extending diametrically thereacross.

As will be evident from FIG. 1 a cup shaft 31 extends transversely across the discharge passage 18 and is supported for rotation by bearings 32 carried by the outer face of the casing 17. Supported on the shaft 31 for rotational movement therewith is a metering cup indicated generally at 33 and shown in detail in FIG. 4. The cup is rigidly secured to the shaft 31 by means of the mounting blocks 34 which are pinned to the shaft.

Figure 3:
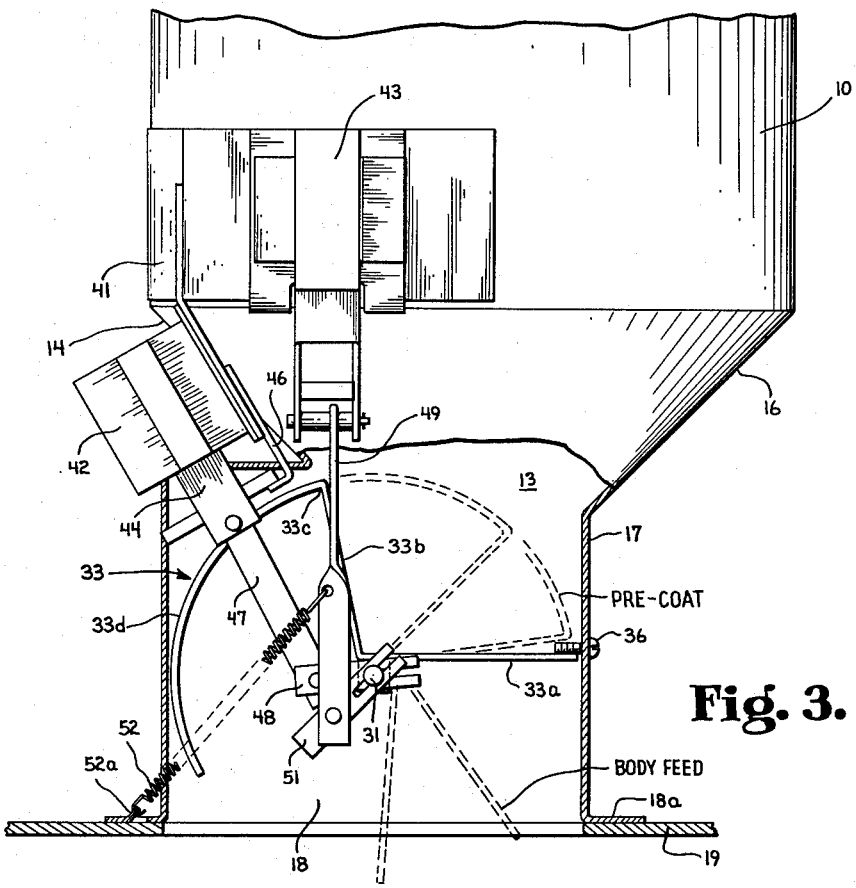
FIG. 3 is a partial, side view of the assembly, with portions broken away, the view being taken at 90° to the sectional view of FIG. 1.
Figure 4:
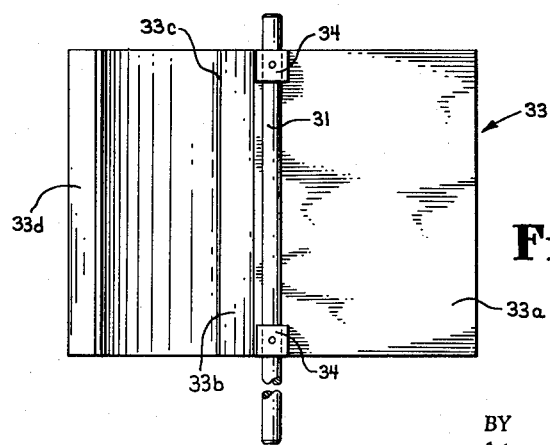
FIG. 4 is a bottom plan view of the metering cup component of the assembly.

As will be evident particularly from FIGS. 3 and 4, the metering cup is generally V-shaped in section transverse to its axis of rotation (the axis of shaft 31), the extending sides of the cup 33a and 33b extending to the adjacent sides of the casing 17 forming the discharge passage 18.

The cup 33 is shown in its normal, fill position in solid lines in FIG. 3 wherein the open face of the cup, that is, the space between the outer margins of the portions 33a and 33b, is directed generally upward toward the hopper outlet aperture 13, this position being defined by engagement of the margin of the portion 33a with a stop abutment 36 extending into the discharge passage 18. If the shaft 31, and consequently the cup 33, is rotated unidirectionally, that is, clockwise as viewed in FIG. 3, until the outer margin of the portion 33b engages the abutment 36, the open face of the cup will then be directed generally downwardly away from the hopper outlet aperture 13 and the filter aid material in the cup be dumped into the filter tank underlying the discharge aperture 18. This position of the cup is identified as the pre-coat position and is illustrated in broken lines in FIG. 3. In moving from the fill position to the pre-coat position it will be evident that the cup will pass through an intermediate position shown in broken lines in FIG. 3 and identified as the body feed position. In the body feed position it will be evident that only a portion of the filter aid in the cup will be dumped or released to pass through the discharge aperture and into the filter tank.

The trailing outer margin 33c of the cup portion 33b (trailing with respect to the direction of rotation of the cup 33) has extending integrally therefrom and away from the open face of the cup a curved closure plate 33d. As will be evident from FIG. 3 the plate 33d is sized so as to span and substantially close the outlet aperture 13 when the cup is in pre-coat position.

The means for rotating the shaft 31 so as to move the cup 33 through its positions identified above will now be described for reference primarily to FIG. 3. Mounted on the side of the hopper 10 is a bracket 41 which serves to support conventional solenoid actuators 42 and 43. The solenoids include plungers 44 which are drawn upwardly into the solenoid coil when the solenoids are energized, the downward limit of motion of the plunger being determined by a stop bracket 46 carried by the primary bracket 41.

Pivotally linked to the end of the plunger for the solenoid 42 is a link member 47, the lower end of the member 47 being pivotally connected to a lever or crank arm 48. The crank arm 48 is bifurcated and the bifurcation rigidly blocks the arm 48 to the shaft 31.

Similarly, the plunger for the solenoid 43 has pivotally connected thereto a link member 49, which at its lower end is pivotally fastened to the lever or crank arm 51. The end of the crank arm 51 is bifurcated and clamped upon the shaft 31 so that it rotates with the shaft.

Solenoid 42 is the body feed solenoid, that is, as will be evident from FIG. 3, when solenoid 42 is energized shaft 31 will be rotated clockwise thereby placing the cup 33 in its body feed position. Upon de-energization of the solenoid 42, tension spring 52 (extending between a tab 52a struck from the flange 18a and the link member 49) serves, through the link member 49 and the arm 51 to return the shaft 31 and the cup 33 to its fill position. When the pre-coat solenoid 43 is energized, upward motion of the link 49 will rotate the arm 51 and the shaft 31, against the force exerted by spring 52, an amount sufficient to place the cup 33 in its pre-coat position.

In operation, it will be understood that an electrical programming control (not shown and forming no part of the present invention) may be untilized to energize the agitator motor 26, the pre-coat solenoid 43 and the body feed 42 in the desired sequence and for the desired cycle periods. In addition to its function of transferring a precoat volume of filter aid and a body feed volume of filter aid to the discharge passage 18 and hence to the filter tank, the cup also serves the additional function of providing a seal or closure above the tank opening when the cup is in fill position and a closure for the outlet aperture 13 when the cup is in pre-coat position. Closure of the discharge opening so as to cut off the tendency of vapors arising from the tank to enter the filter hopper through the outlet aperture 13 is particularly important since the presence of such vapors in the hopper results in their condensation on the filter aid powder and this, in prior art devices, causes erratic operation of filter aid feeding components.

While a tubular filter of the pressure type has been described as environment for the assembly of the present invention, it will be understood that the assembly is suitable for operation with any type of filter requiring the addition of powder filter aids, and that the assembly may be used for feeding bulk materials which are basically flowable in nature at a controlled rate.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A filter aid feeder assembly comprising a closed storage hopper having an outlet aperture and a discharge passage extending from the outlet aperture, a shaft mounted for rotation within the hopper terminating adjacent said outlet aperture and carrying means for agitating the filter aid within the hopper to prevent bridging thereof, a motor mounted within the hopper connected to said shaft, said discharge passage being rectangular in cross-sectional configuration, and a metering cup mounted for rotation within said discharge passage on an axis transverse to the direction of movement of filter aid from said hopper, said cup being generally V-shaped in section transverse to its axis of rotation and extending parallel to its axis of rotation to the sides of said discharge passage, said cup being rotatable unidirectionally from a fill position wherein the open face of said cup is directed upwardly toward said hopper outlet aperture, to a pre-coat position wherein the open face of said cup is directed downwardly away from said hopper outlet aperture, and through a body feed position intermediate between said fill and pre-coat positions, the trailing margin of said cup having a curved plate extending therefrom away from the open face of said cup and spanning said hopper outlet aperture when said cup is in said pre-coat position and closing said discharge passage when said cup is in said full position, said metering cup being mounted for rotation by means of a shaft rigidly secured to the cup and extending exteriorly of said housing, first and second power means mounted adjacent said shaft, and motion transmission linkage extending between said power means and said shaft whereby upon energization of said first power means said shaft is rotated to place said cup in its said pre-coat position and upon energization of said second power means said shaft is rotated to place said cup in its said body feed position.

2. A filter aid feeder assembly comprising a closed storage hopper having an outlet aperture and a discharge passage extending from the outlet aperture, said discharge passage being rectangular in cross-sectional configuration, and a metering cup mounted for rotation within said discharge passage on an axis transverse to the direction of movement of filter aid from said hopper, said cup being generally V-shaped in section transverse to its axis of rotation and extending parallel to its axis of rotation to the sides of said discharge passage, said cup being rotatable from a first position wherein the open face of said cup is directed upwardly toward said hopper outlet aperture, to a second position wherein the open face of said cup is directed downwardly away from said hopper outlet aperture, and through a third position intermediate between said first and second positions, the trailing margin of said cup having a curved plate extending therefrom away from the open face of said cup and spanning said hopper outlet aperture when said cup is in said second position and closing said discharge passage when said cup is in said first position, said metering cup being mounted for rotation by means of a shaft rigidly secured to the cup and extending exteriorly of said housing, first and second power means mounted adjacent said shaft, and motion transmission linkage extending between said power means and said shaft whereby upon energization of said first power means said shaft is rotated to place said cup in its said second position and upon energization of said second power means said shaft is rotated to place said cup in its said third position.

3. A filter aid feeder assembly comprising a closed storage hopper having an outlet aperture and a discharge passage extending from the outlet aperture, a shaft mounted for rotation within the hopper terminating adjacent said outlet aperture and carrying means for agitating the filter aid within the hopper to prevent bridging thereof, a motor mounted within the hopper connected to said shaft, said discharge passage being rectangular in cross-sectional configuration, and a metering cup mounted for rotation within said discharge passage on an axis transverse to the direction of movement of filter aid from said hopper, said cup being generally V-shaped in section transverse to its axis of rotation and extending parallel to its axis of rotation to the sides of said discharge passage, said cup being rotatable unidirectionally from a fill position wherein the open face of said cup is directed upwardly toward said hopper outlet aperture, to a pre-coat position wherein the open face of said cup is directed downwardly away from said hopper outlet aperture, and through a body feed position intermediate between said fill and pre-coat positions, said metering cup being mounted for rotation by means of a shaft rigidly secured to the cup and extending exteriorly of said housing, first and second power means mounted adjacent said shaft, and motion transmission linkage extending between said power means and said shaft whereby upon energization of said first power means said shaft is rotated to place said cup in its said pre-coat position and upon energization of said second power means said shaft is rotated to place said cup in its said body feed position.

References Cited by the Examiner

UNITED STATES PATENTS

| | | | |
|---|---|---|---|
| 2,532,698 | 12/50 | Corkins | 222—363 X |
| 2,536,790 | 1/51 | Weishaar | 222—355 X |
| 2,601,943 | 7/52 | Torrese | 222—233 X |
| 2,672,259 | 3/54 | Hobgood | 222—233 X |

FOREIGN PATENTS 242,932   1/12   Germany.

LOUIS J. DEMBO, *Primary Examiner.*